(12) United States Patent
Shih

(10) Patent No.: US 7,232,231 B2
(45) Date of Patent: Jun. 19, 2007

(54) LENS FOR REARVIEW MIRROR

(75) Inventor: Kai-Tsung Shih, Taichung (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 33 days.

(21) Appl. No.: 11/291,766

(22) Filed: Dec. 2, 2005

(65) Prior Publication Data

US 2007/0053085 A1    Mar. 8, 2007

(51) Int. Cl.
*G02B 5/08* (2006.01)

(52) U.S. Cl. ....................................... 359/839

(58) Field of Classification Search ................. 359/602, 359/603, 608, 609, 839, 883, 884; 362/494, 362/509, 510
See application file for complete search history.

(56) References Cited

U.S. PATENT DOCUMENTS

2006/0164725 A1* 7/2006 Horsten et al. ............. 359/485

* cited by examiner

*Primary Examiner*—Alessandro Amari
(74) *Attorney, Agent, or Firm*—Bacon & Thomas, PLLC

(57) ABSTRACT

A lens for a vehicle rearview mirror includes a light-transmissible glass substrate, which has a first surface and a second surface opposite to the first surface, a first coating layer, which has a reflectivity of 10–20% and is coated on the first surface of the glass substrate and defines with the first surface of the glass substrate a first transmission zone, a second coating layer, which has a reflectivity of 40–55% and is coated on the whole area of the second surface of the glass substrate, and a back layer, which is covered on the second coating layer and defines with the second coating layer a second transmission zone corresponding to the first transmission zone.

10 Claims, 3 Drawing Sheets

LENS FOR REARVIEW MIRROR

BACKGROUND OF THE INVENTION

1. Field of the Invention

The present invention relates to a vehicle rearview mirror and more particularly, to a lens for a rearview mirror combined with a liquid crystal display (LCD) monitor, which optimizes the recognition of the LCD light source.

2. Description of the Related Art

Following fast development of high technology, people can quickly obtain different information and messages from different sources. In order to let the driver obtain the latest information, automobile manufacturers install an LCD monitor in the internal rearview mirror of each car. When driving the car, the driver can obtain from the LCD monitor in the car's internal rearview mirror the desired information such as driving speed, distance with the car moving ahead or the car approaching from behind (integrated with the back sensor), and other related data.

FIG. 1 shows a lens for a rearview mirror for the above-mention purpose according to the prior art design. According to this design, the lens comprises a glass substrate 1, a coating layer 2, and a back layer 3. The coating layer 2 is evenly coated on the back surface of the glass substrate 1. The back layer 3 is covered on the coating layer 2, leaving a predefined area of the coating layer 2 in blank. Therefore, the predetermined area of the coating layer 2 that is not covered by the back layer 3 forms a transmission zone 4 for the passing of the light emitted from the LCD monitor to the outside of the rearview mirror during the operation of the LCD monitor so that the driver can see the image provided by the LCD monitor. However, there is a standard, i.e. Standard E-MARK R46, governing the reflectivity of a vehicle's internal rearview mirror, i.e., the reflectivity of the lens must be over 40% so that the driver can see clearly the image of the rear side of the car reflected by the lens of the rearview mirror to ensure a safety driving. Because the main function of the coating layer 2 is to cause a reflection of light and the function of the back layer 3 is to absorb light properly and to reduce the color difference between the reflected image and the light from the LCD monitor, the reflectivity of the coating layer 2 must be increased to about 60–70% so that the reflectivity of the lens can be maintained over 40% after the light absorbing action of the coating layer 2 and the back layer 3. However, because the transmission zone 4 cannot be covered by the back layer 3 (for enabling the light of the LCD monitor to pass), the reflectivity in the transmission zone 3 is as high as 60–70%, i.e., the transmissivity T1 of the transmission zone 4 is only about 30–40%. This low transmissivity of the transmission zone 4 will reduce the brightness of the light (information) provided by the LCD monitor. Therefore, the image reflecting intensity (reflectivity about 60–70%) in the transmission zone 4 will surpass the light intensity (transmissivity about 30–40%) of the light provided by the LCD monitor, and an illusion will be produced due to an overlay of the information provided by the LCD monitor on the reflecting image. Further, in order to protect the user's eyes against the irritation of long wavelength light, a blue glass is commonly used for the lens. However, under a high reflectivity, the long wavelength light will cause a reddish image after passing of the light from the LCD monitor through the glass substrate 1, such reddish image will irritate the user's eyes.

SUMMARY OF THE INVENTION

The present invention has been accomplished under the circumstances in view. It is therefore an object of the present invention to provide a lens for a rearview mirror with LCD monitor, which optimizes the recognition of the LCD light.

To achieve this object of the present invention, the lens for a vehicle rearview mirror includes a light-transmissible glass substrate having a first surface and a second surface opposite to the first surface, a first coating layer, which has a reflectivity of 10–20% and is coated on the first surface of the glass substrate and defines with the first surface of the glass substrate a first transmission zone that is not covered by the first coating layer, a second coating layer, which has a reflectivity of 40–55% and is coated on the whore area of the second surface of the glass substrate, and a back layer, which is covered on the second coating layer and defines with the second coating layer a second transmission zone, which is not covered by the back layer, corresponding to the first transmission zone.

DETAILED DESCRIPTION OF THE INVENTION

Figure 1:
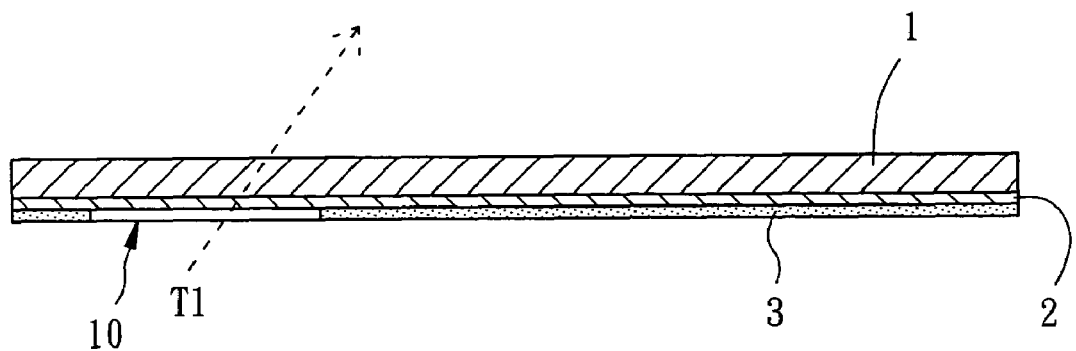
FIG. 1 is a schematic sectional view of a lens for a rearview mirror according to the prior art.
Figure 2:
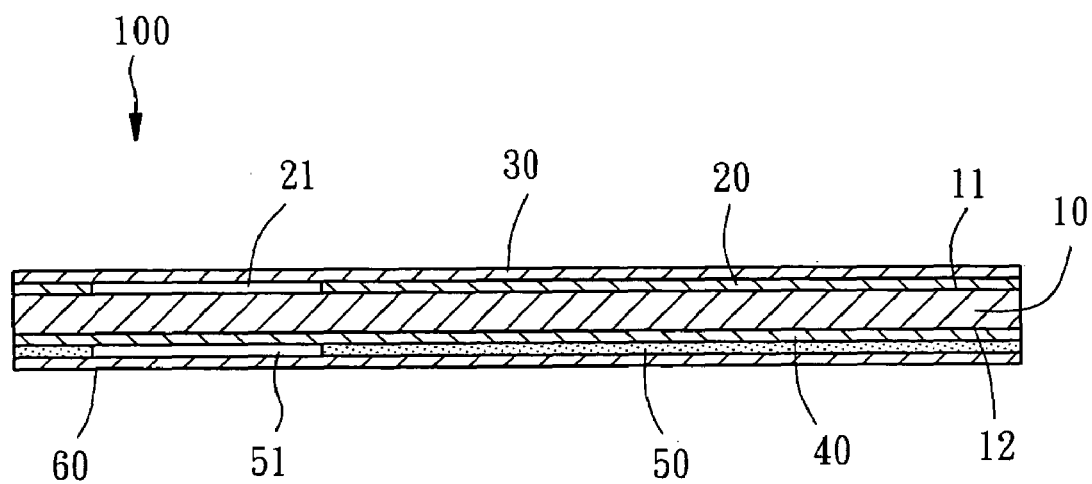
FIG. 2 is a schematic sectional view of a lens for a rearview mirror according to a preferred embodiment of the present invention.
Figure 3:
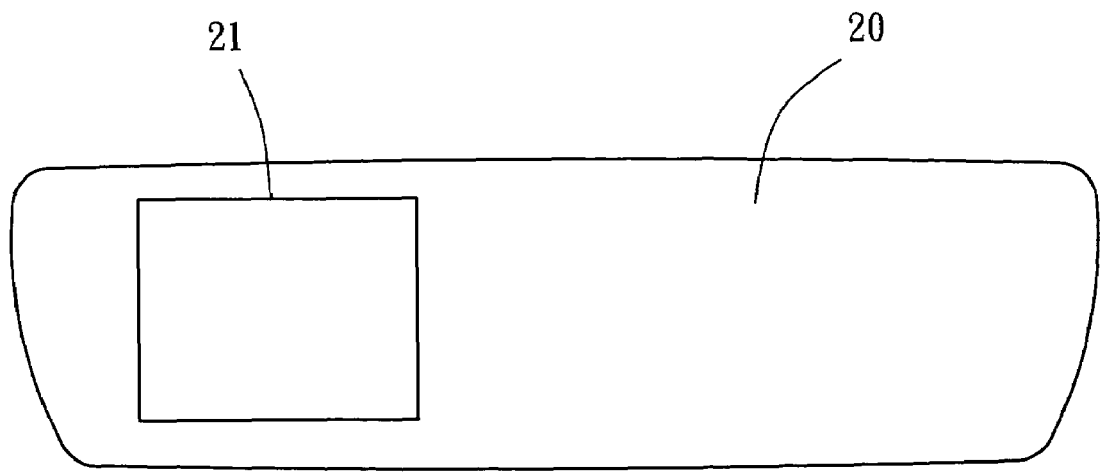
FIG. 3 is a plane view showing the first coating layer around the first transmission zone according to the preferred embodiment of the present invention.
Figure 4:
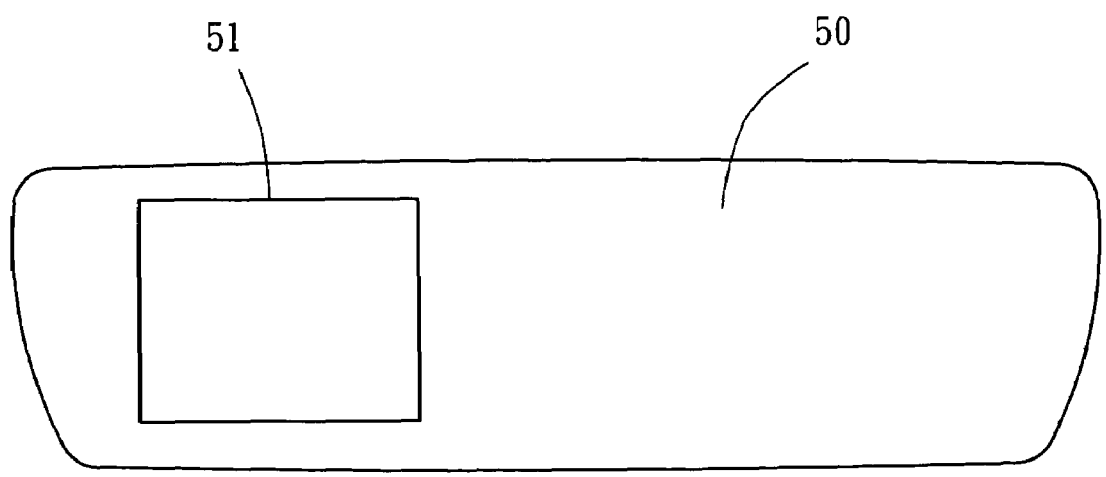
FIG. 4 is a plane view showing the back pain layer around the second transmission zone according to the preferred embodiment of the present invention.

Referring to FIGS. 2–4, a lens 100 for a rearview mirror in accordance with a preferred embodiment of the present invention is shown comprising a glass substrate 10, a first coating layer 20, an anti-scraping coating layer 30, a second coating layer 40, a back layer 50, and an anti-knocking coating layer 60.

The glass substrate 10 admits light, having a predetermined contour and defining a first surface 11 and a second surface 12 opposite to the first surface 11.

The first coating layer 20 is a coating of $TiO_2$ or $SiO_2$ coated on the first surface 11 of the glass substrate 10, leaving a predefined area of the first surface 11 in blank. Therefore, the predetermined area of the first surface 11 that is not covered by the first coating layer 20 forms a first transmission zone 21. The reflectivity of the first coating layer 20 is about 10–20%. Further, trace elements may be added to $TiO_2$ or $SiO_2$ to change the spectral absorption or reflection characteristic of the first coating layer 20.

The anti-scraping coating layer 30 admits light and is coated on the first coating layer 20, having a hard characteristic for protection against scraping.

The second coating layer 40 can be prepared from $TiO_2$ or $SiO_2$ and added with trace elements to change the spectral absorption or reflection characteristic. The second coating layer 40 covers the whole area of the second surface 12 of the glass substrate 10. The reflectivity of the second coating layer 40 is about 40–55%.

The back layer 50 is covered on the second coating layer 40, leaving a predefined area of the second coating layer 40 corresponding to the first transmission zone 21 in blank. Therefore, the predetermined area of the second coating layer 40 that is not covered by the back layer 50 forms a second transmission zone 51. The back layer 50 is adapted to absorb a part of light rays and to compensate the color difference relative to the light of the LCD monitor.

The anti-knocking coating layer 60 admits light, and is covered on the back layer 50 to prevent glass substrate 10 from scattering upon an impact.

Figure 5:
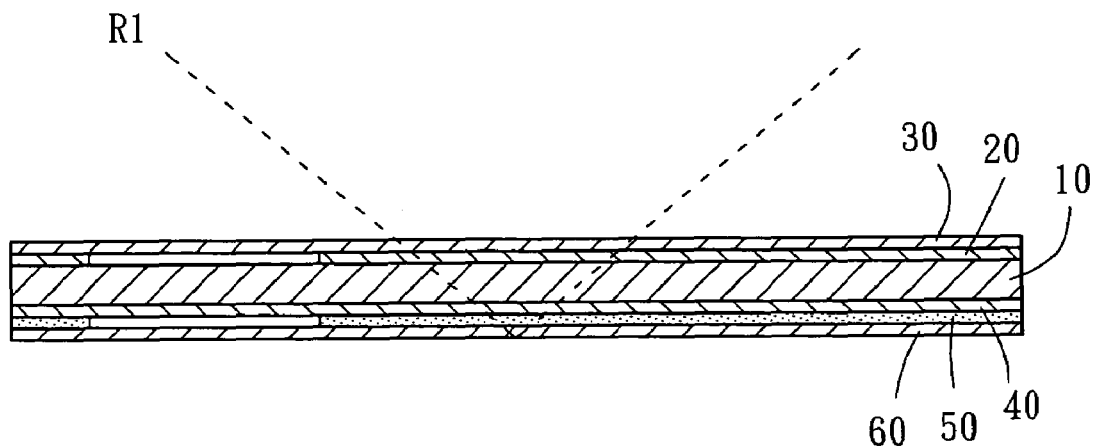
FIG. 5 is a schematic sectional view of the present invention, showing the image reflection action of the lens.
Figure 6:
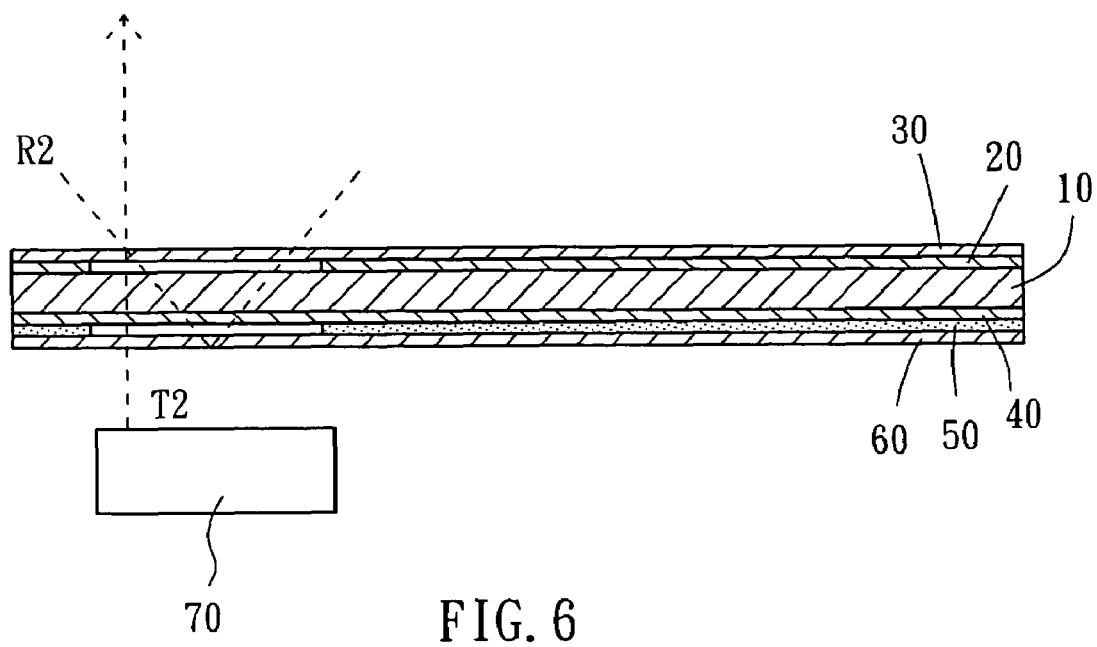
FIG. 6 is a schematic sectional view of the present invention, showing the image reflection and transmission actions of the lens.

The use and main features of the lens 100 are described hereinafter with reference to FIGS. 5 and 6. The LCD monitor 70 is set facing the anti-knocking coating layer 60 relative to the first transmission zone 21 and the second transmission zone 51.

When the external light (image) passes in proper order through the anti-scraping coating layer 30, the first coating layer 20, the glass substrate 10 and the second coating layer 40 to the back layer 50, the light (image) is reflected outwards for viewing by the user. Because the reflectivity of the first coating layer 20 is about 10–20% and the reflectivity of the second coating layer 40 is about 40–55%, the total reflectivity R1 of the first coating layer 20 and the second coating layer 40 is about 50–75% (see FIG. 5). At final, the back layer 50 absorbs a small part of the light. Therefore, the reflectivity of the lens 100 is over 40% that is in conformity with the related standard.

When the LCD monitor 70 is emitting light (mobile information), the light from the LCD monitor 70 passes in proper order through the anti-knocking coating layer 60, the second transmission zone 51, the second coating layer 40, the glass substrate 10, the first transmission zone 21 and the anti-scraping coating layer 30. Because only the second coating layer 40 (reflectivity R2 at 40–55%) affects the light from the LCD monitor 70, the transmissivity T2 of the light is about 45–60% (see FIG. 6). When comparing with the transmissivity of 30–40% of the prior art design, the user can see more clear the mobile information provided by the LCD monitor 70.

Therefore, the invention keeps the non-transmission zone of the lens at a high reflectivity (50–75%) so that the driver can see clearly the image of the rear side of the car. The invention also keeps a proper reflectivity (40–55%) at the transmission zone of the lens so as to obtain a high transmissivity (45–60%) for easy recognition of the message provided by the LCD monitor, preventing an illusion or a reddish color of the message from the LCD monitor that may irritate the user's eyes.

What is claimed is:

1. A lens for a vehicle rearview mirror comprising:
   a glass substrate admitting light and having a first surface and a second surface opposite to said first surface;
   a first coating layer coated on the first surface of said glass substrate and defining with the first surface of said glass substrate a first transmission zone that is not covered by said first coating layer, said first coating layer having a reflectivity of 10–20%;
   a second coating layer coated on the whole area of the second surface of said glass substrate, said second coating layer having a reflectivity of 40–55%; and
   a back layer covered on said second coating layer and defining with said second coating layer a second transmission zone that is not covered by the back layer and corresponds in location to said first transmission zone.

2. The lens as claimed in claim 1, wherein the reflectivity counted from said first transmission zone to said second transmission zone is 45–60%.

3. The lens as claimed in claim 1, wherein the reflectivity counted from said first coating layer to said back layer is 50–75%.

4. The lens as claimed in claim 1, wherein said first coating layer is prepared from titanium dioxide.

5. The lens as claimed in claim 1, wherein said first coating layer is prepared from silicon dioxide.

6. The lens as claimed in claim 1, wherein said second coating layer is prepared from titanium dioxide.

7. The lens as claimed in claim 1, wherein said second coating layer is prepared from silicon dioxide.

8. The lens as claimed in claim 1, wherein said first coating layer and said second coating layer are respectively added with a predetermined amount of trace elements.

9. The lens as claimed in claim 1, further comprising an anti-scraping coating layer that admits light and is coated on said first coating layer for protection against scraping.

10. The lens as claimed in claim 1, further comprising an anti-knocking coating layer that admits light and is coated on said back layer to prevent said glass substrate from scattering upon an impact.

* * * * *